No. 689,910. Patented Dec. 31, 1901.
E. W. T. RICHMOND.
WATER HEATER.
(Application filed Dec. 21, 1900.)
(No Model.) 3 Sheets—Sheet 1.
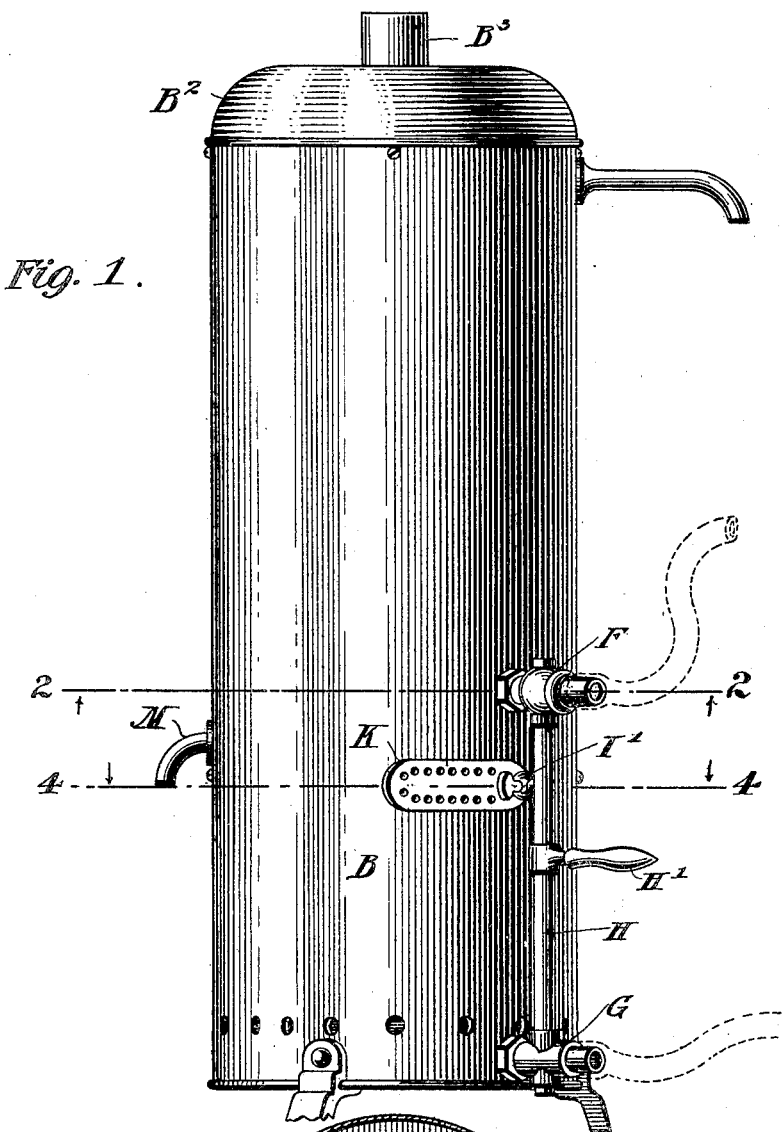
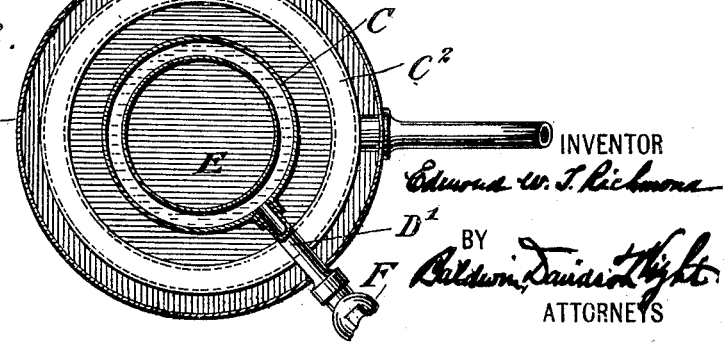

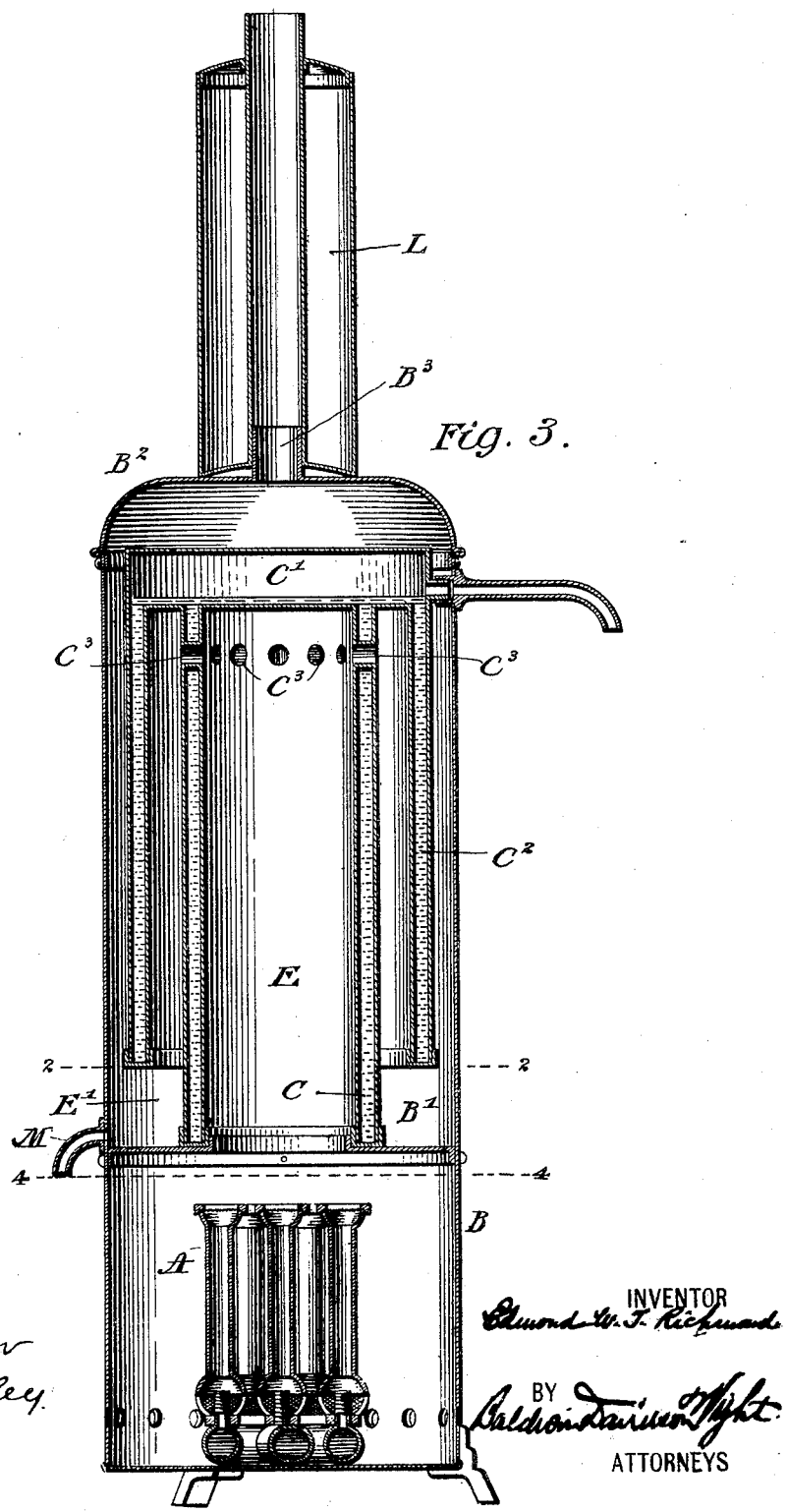

No. 689,910. Patented Dec. 31, 1901.
E. W. T. RICHMOND.
WATER HEATER.
(Application filed Dec. 21, 1900.)
(No Model.) 3 Sheets—Sheet 3.
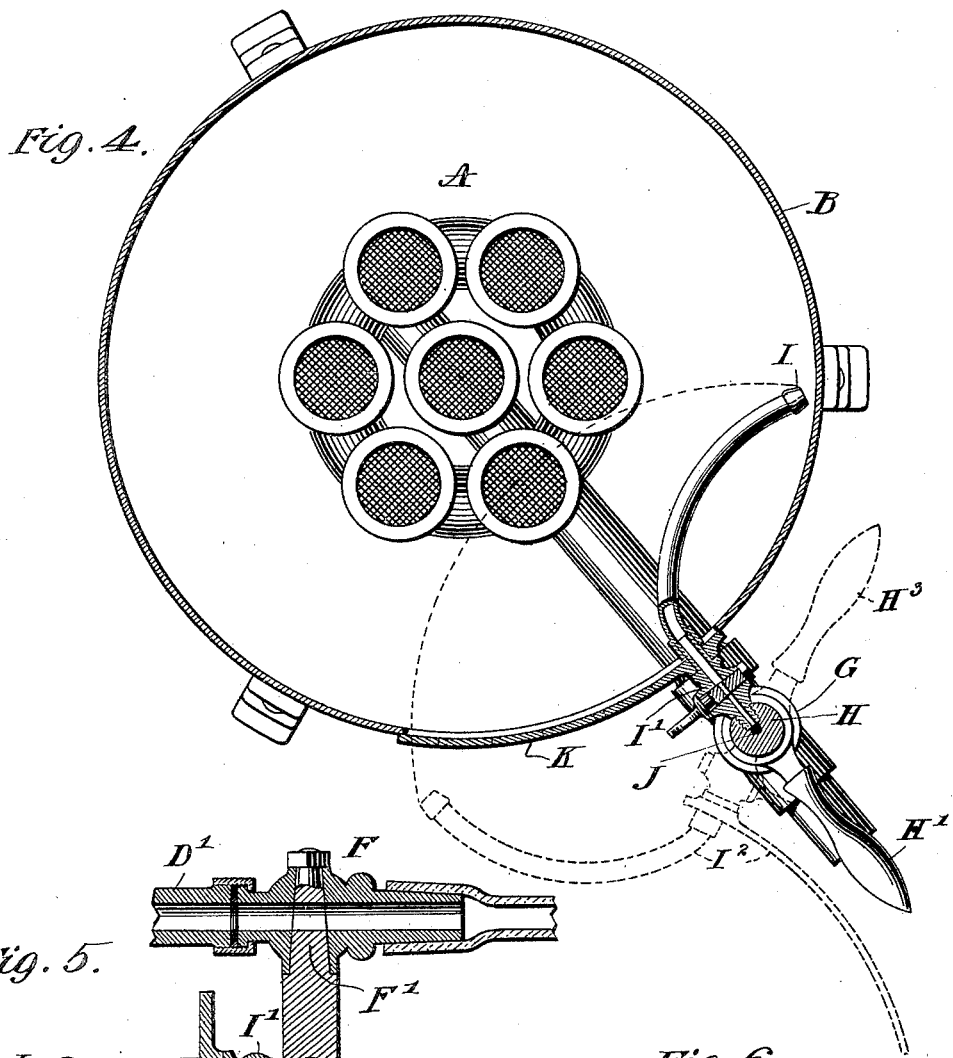
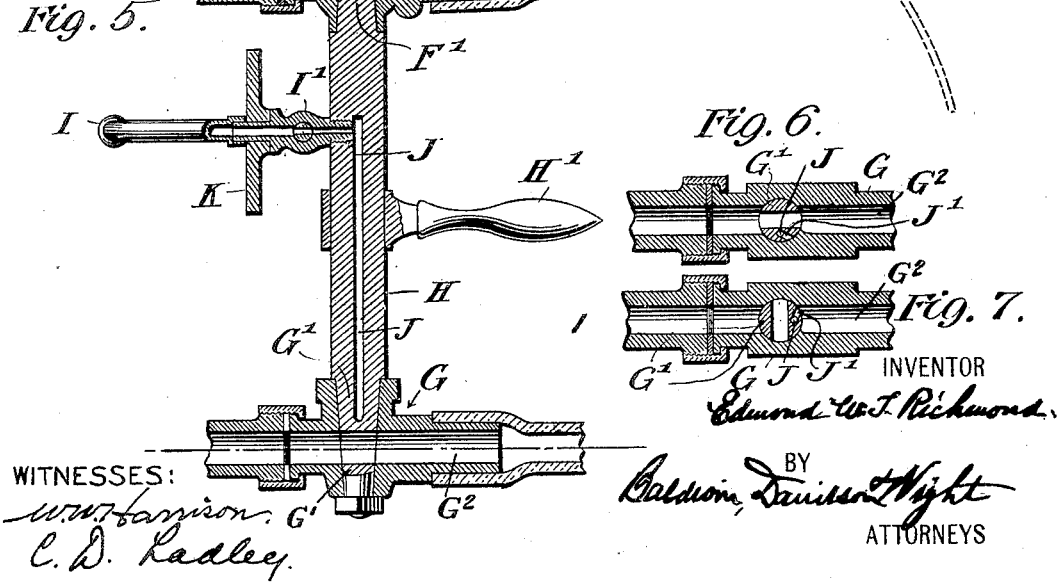
INVENTOR
Edmond W. T. Richmond.
BY
Baldwin, Davidson & Wight
ATTORNEYS
WITNESSES:
W. W. Harrison.
C. D. Radley.

UNITED STATES PATENT OFFICE.

EDMOND W. T. RICHMOND, OF ROMFORD, ENGLAND.

WATER-HEATER.

SPECIFICATION forming part of Letters Patent No. 689,910, dated December 31, 1901.

Application filed December 21, 1900. Serial No. 40,646. (No model.)

*To all whom it may concern:*

Be it known that I, EDMOND W. T. RICHMOND, a subject of the Queen of Great Britain, residing at Summercourt, Romford, Essex county, England, have invented certain new and useful Improvements in Water-Heaters, of which the following is a specification.

This invention relates to that class of apparatus for heating water by means of gas, such as are used for domestic purposes and for analogous uses.

It consists in certain novel features of construction and arrangement of the water-supply to the heater and of the gas-supply to the burner, whereby the controlling valves or cocks of such supplies are simultaneously manipulated from one means of operation, such operating means also including the manipulation of the pilot-burner, which is moved out of the apparatus when the water-supply and the gas-supply are cut off, so that said pilot-burner may then be lighted, it then being in communication with the gas-supply of the apparatus, and is moved into the apparatus over the nest of gas-burners therein and by its light ignites the gas issuing from said nest of burners. The operation of moving the pilot-light into the apparatus by the controlling means opens the gas-supply to the burners, so that they have a full supply of gas by the time the pilot-light passes by or over them, the water-supply to the heater being at the same time turned on. The pilot-light is supplied with gas through a by-passage in the cock that supplies the gas to the nest of burners, said by-passage being so arranged that when the pilot-burner has passed into the apparatus to the limit of its movement therein after passing by the nest of burners the gas-supply to the pilot-burner is cut off.

In describing this invention more particularly reference will be had to the accompanying drawings, forming part of the specification, in which—

Figure 1 is an elevation of my improved water-heater, showing more particularly the water-supply device, the gas-supply device, the pilot-light, and their operating means. Fig. 2 is a horizontal sectional plan of Fig. 1 on the line 2 2. Fig. 3 is a vertical central section of the apparatus. Fig. 4 is a horizontal section, enlarged, on the line 4 4, Fig. 1. Fig. 5 is an enlarged sectional view of the water and gas supply devices, pilot-burner, and their operating means. Figs. 6 and 7 are horizontal sectional views of the gas-supply-controlling device.

The water-heater and the nest of gas-burners A are inclosed in a cylindrical shell B, said burners resting on the closed bottom of the shell, a little above which holes are formed in the shell for the supply of air to the burners, and the water-heater rests upon a plate or diaphragm B', secured to the shell just above the gas-burners A, said diaphragm having a central circular opening. The water-heater consists of a narrow annular water-chamber C, closed at its lower end and resting on the diaphragm B' within a flange formed around the central opening of the diaphragm, the upper end of the annular chamber C being connected to a flat circular chamber C', which is slightly less in diameter than the shell B, the two walls forming the annular chamber C being suitably secured to the bottom of the flat chamber C', so that free communication is had between the chamber C' and the annular chamber. Another annular chamber $C^2$, whose outer diameter is substantially that of the flat chamber C', is by its walls also connected to the bottom of the chamber C', and its lower end is closed and is located a short distance from the diaphragm B'. Near the upper end of the annular chamber C thimbles or short pipes $C^3$ pass through it and are connected at the walls of the annular chamber to form water-tight joints, the openings through said thimbles affording passages between the cylindrical space of the annular chamber C and the annular space between the annular chamber C and the annular chamber $C^2$. A hood $B^2$ on the top of the shell B extends over the flat cylindrical water-chamber C' and is provided at its central part with a flue or chimney $B^3$. From the side of the flat cylindrical water-chamber C' extends a discharge-spout, from which the heated water is collected as it passes from the heater. The water-supply-controlling device is connected to the lower end of the central annular water-chamber C by the short pipe D'. (Shown at Fig. 2.) It will be observed that by this construction of water-heater and its relation to the gas-burners A the heated products of combustion first pass up the central space E, flowing over the inner wall of the annular water-space C, then through the opening of the thimbles C³, into and down the annular space E', there acting on the outer wall of the annular water-space C and the inner wall of the annular water-space C². From this space E' the products of combustion pass up around and act on the outer wall of the annular water-chamber C² and over the top of the flat circular chamber C', and so out of the apparatus by the flue or chimney B³. By this it would seem that a very large heating-surface is provided and that practically all of the heat given off by the gas burned at the burners A will be utilized in raising the temperature of the water flowing through the generator.

The water-controlling device is shown as an ordinary plug-cock F, connected by a union-joint to the short pipe D'. The gas-controlling device is also a plug-cock G, having special features of construction, and is connected by a union-joint to the supply-pipe of the burners A. These plug-cocks F and G when in operative position have a common axis for their plugs F' and G', and said plugs are connected together by a rod or stem H, which is provided with a handle H' and by which the two plugs are simultaneously operated, the opening through said plugs being so arranged that they are in opened and closed positions at the same time. The pilot-burner I is on the end of a curved pipe which is attached to the rod or stem H through the medium of the small cock I', and an opening or passage J is provided from the cock I' down through the rod or stem H into the plug G' of the gas-controlling device G and passes out through the side of the plug laterally in relation to the main core or opening of the plug. This lateral opening J' is so arranged in relation to the inlet-passage G² of the gas-controller that free communication is had between them, and so free communication is had from the passage G² to the pilot-burner when the main core or body of the plug G' closes said passage to prevent the flow of gas to the burners A, as shown at Fig. 7, and said passage J' becomes closed, as shown at Fig. 6, just before the plug G' is moved to afford full opening of the gas-controlling device; but this passage remains open during a considerable interval of time while gas is allowed to flow through the gas-controller to the burners A, the object of which construction and arrangement will be hereinafter described. This pilot-burner I is, as before described, operated to be moved out of the apparatus, as shown by the dotted lines I², Fig. 4, the operating-handle H' then being in position, as shown by the dotted lines H³, both of the valves F and G being then closed. In passing from this position to its position in the apparatus, as shown by the full line of Fig. 4, it enters the apparatus through an opening formed in the shell B, which opening is closed by a door or shield K, attached to and carried by the pilot-burner pipe. This door or shield K is preferably perforated, so as to admit of a further supply of air to the gas-burners than what would pass to them through the holes formed at the lower end of the shell B. The operation of this part of the apparatus is as follows: The pilot-burner being in its outer position, gas flows to it through the passages J' J and the cock I', which cock may be used to either entirely cut off the gas from the burner I or to regulate the supply of gas to it. The gas issuing from the burner I is ignited, and as this pilot-burner is moved by the handle H' into the apparatus it passes over the burners A, and so ignites the gas which at this time is supplied to the burners, and after passing over the burners before it reaches its extreme inner position, as shown at Fig. 4, the supply of gas to it is cut off by the closing of the passage J' of the plug G', as before described, so that no gas flows through the pilot-burner I should its cock I' be left open. When the pilot-burner is in the position shown in Fig. 4, then the perforated door K, carried by it, closes the opening in the casing B, through which the pilot-burner is passed.

L is a chamber having a cylindrical or other suitable form placed on the hood B² of the apparatus and surrounding the flue B³. It may be provided with a door, so that it may be utilized as a heating-chamber for drying clothes, towels, &c., and for other heating purposes. A discharge-spout M is provided for the discharge of any aqueous or fluid matter that may by condensation of products of combustion collect on the diaphragm B', and this spout may be provided with a valve or cock.

I claim as my invention—

In a water-heating apparatus, in combination, a gas-supply plug-cock having a perforated stem extending from its plug, gas-burners connected with the cock, and a pilot-burner carried by the extension-stem of the plug and in communication through the stem with the entrance-passage of the cock, said pilot-burner being arranged to be moved over the burners when the plug is turned to supply gas to the burners, and the gas-supply cock being so constructed as to cut off gas from the pilot-burner when it shall have reached the end of its inward excursion.

In testimony whereof I have hereunto subscribed my name.

EDMOND W. T. RICHMOND.

Witnesses:
 KATHARINE MacMAHON,
 EDWARD C. DAVIDSON.